Patented May 13, 1952

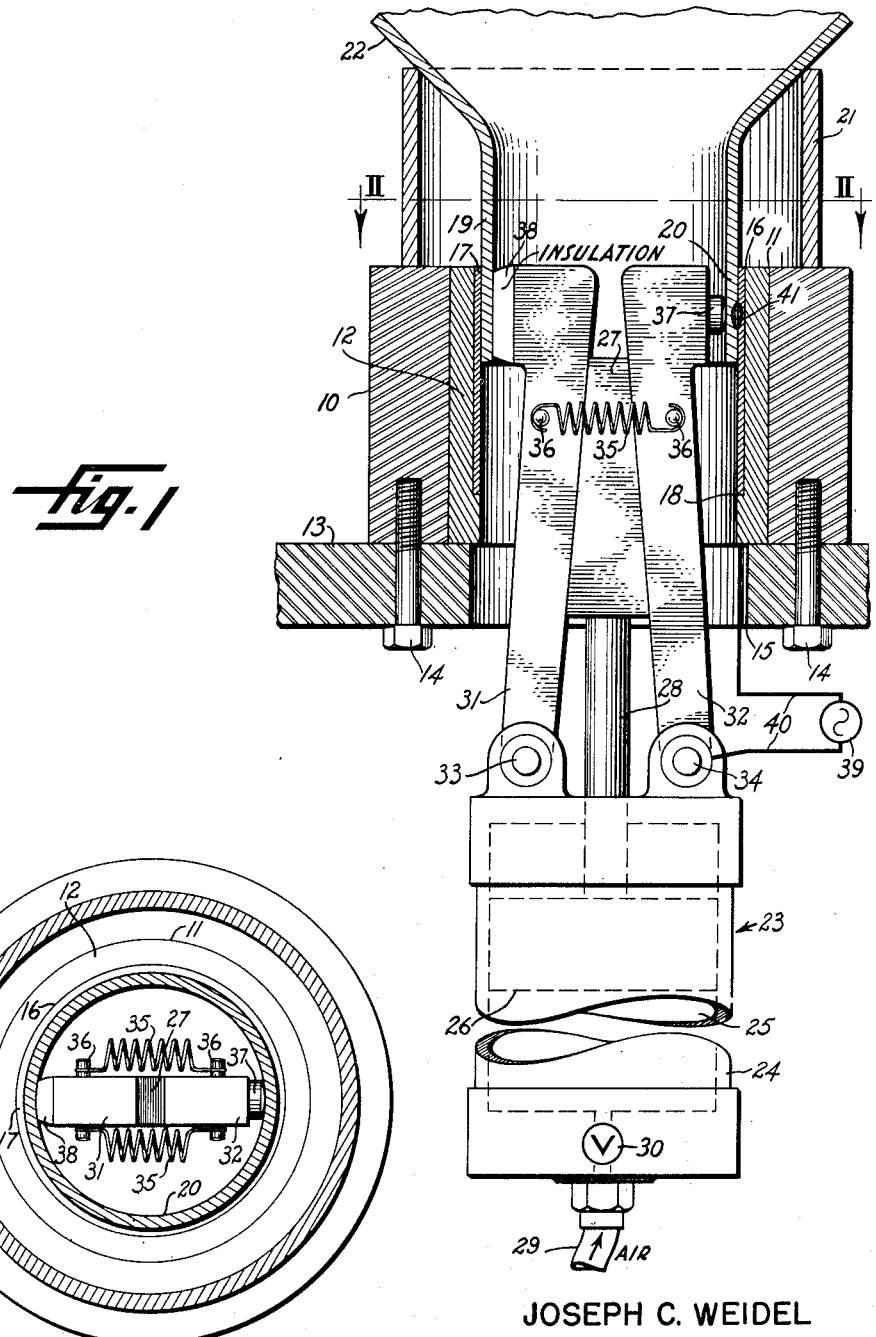

2,596,453

UNITED STATES PATENT OFFICE 2,596,453

METHOD AND MACHINE FOR SPOT WELDING

Joseph C. Weidel, Bonita, Calif., assignor to Rohr Aircraft Corporation, Chula Vista, Calif., a corporation of California Application May 18, 1951, Serial No. 226,969

6 Claims. (Cl. 219—6)

1

This invention relates to electric spot welding and particularly to a machine and method for welding metal tubes or tube-like members together.

It is an object of the invention to provide a welding machine adapted to spot welding two metal tubes together at two or more places without the necessity of moving the tubes and while they are held together in a desired assembled relationship.

Another object is to provide a welding machine which is light in weight and readily portable.

A further object is the provision of a welding machine the end portion of which is capable of being inserted into a tube of small diameter to weld the tube to another tubular member.

Another object is to provide a method and machine for spot welding in which one of the welding electrodes serves as a fixture to hold the parts to be welded in a desired assembled relationship during the welding operation.

Other and further objects will become apparent as the description thereof proceeds. For a better understanding of the invention, reference is made to the accompanying drawing, in which:

Figure 1 is a view, partly in cross section and partly schematic, of a welding machine embodying the invention and, Figure 2 is a sectional view taken on the line 2—2 of Figure 1.

The electric spot welding machine illustrated comprises a metal electrode support 10 having a circular bore 11 adapted to snugly receive a ring shaped electrode 12 made of copper or other metal having a high electrical conductance. The aforementioned parts are supported on a table 13 to which support 10 is secured by any suitable means, such as a pair of screws 14. A large opening 15 is provided in table 13 to permit entrance of the welding machine to be later described. Electrode 12 is cut away to provide a cylindrical bore 16 in which the cylindrical tube 17 to be welded is received, the lower end of tube 17 resting on the ledge 18 formed at the end of bore 16. The tube 19 to be welded to tube 17 terminates in a portion 20 of circular cross section which fits within tube 17 and is supported on an annular fixture 21 which contacts a flared out portion 22 of the tube. It will be understood that any other type of fixture may be used to support tube 19 and that electrode 12 serves as a supporting fixture for tube 17 so that the desired amount of overlap with tube 19 is secured. It will also be understood that if tubes of elliptical, square or other cross-sectional shape are to be welded, the shape of bore 16 will be changed to correspond.

2

The portable tool 23, which is used to actuate the welder, comprises a cylindrically shaped member 24 having a cylindrical bore 25 within which is disposed a piston 26. The piston operates a double tapered wedge 27 to which it is connected by a rod 28. Compressed air is supplied to the lower end of bore 25 through a flexible air hose 29 and manual control valve 30. The tapered edges of wedge 27 are adapted to bear against the edges of two metal arms 31, 32 which are pivotally mounted on pins 33, 34 secured to member 24 near its upper end. The arms 31, 32 are biased towards each other by any suitable means as, for example, coil springs 35, the ends of which are anchored to pins 36 extending through arms 31 and 32 respectively. Arm 32 carries near its upper end a cylindrical welding electrode 37 which, along with arm 32, is made of copper or other metal having a high capacity for electrical conductance. Arm 31 is provided with a tip 38 of insulation material adapted to engage the interior of tube 19 at a place diametrically opposite to that engaged by electrode 37. Alternating current of low voltage and high amperage is supplied from any suitable current source 39 to arm 32 and fixture 12 through a pair of leads 40.

To make a weld, the operator lowers tube 17 into bore 16 of fixture 12 until it rests on the ledge 18 and then lowers tube 19 into tube 17 until it rests on fixture 21, the desired overlap of the two tubes now being provided. The operator then brings welding tool 23 into position below the tubes and raises it until welding electrode 37 is at the desired position for the first weld. He then actuates valve 30 to admit compressed air into cylinder 24 and immediately releases the valve whereupon piston 26 rises, causing wedge 27 to separate the arms 31—32. When tip 38 engages tube 19, electrode 37 commences to be pressed against tube 19, this pressure increasing as wedge 27 rises. The effect of this pressure is to cause a large electrical current to flow through the two tubes in the region between electrode 37 and fixture 12 and fuse some of the material of both tubes to form a nugget, as indicated at 41, this following the well known basic principle of spotwelding. The tubes in the region of the weld are maintained under pressure for a brief interval until wedge 27 commences to move down under the action of the air above piston 26 which is now under compression. Valve V is preferably of a well known construction which permits the compressed air below piston 26 to quickly escape, after the valve is released by the operator. If the operator wishes to weld the tubes in two or more places, he merely rotates the tool 23 through 120 degrees and actuates valve 30 again. This causes a second weld nugget to be formed 120 degrees from the first in the manner just described and by again repeating the process a third nugget may be formed 120 degrees from each of the others.

Machines for welding tubes together are known in which two levers, which move in opposite directions are provided, each carrying an electrode. The end of one lever and its electrode are advanced inside the tubes and the end of the other lever and its electrode are advanced along the outside of the tubes to the location of the weld, and the levers then drawn together to cause the electrodes to engage the tubes. This motion of the lever outside the tubes requires a slot to be cut in the table (such as table 13 illustrated) which carries the tube-locating fixture. At times another fixture or jig required in connection with another welding or machining operation to be performed on the tubes is located in the path of travel of the outside lever, so that it cannot reach the outer tube and it is not possible to effect the weld. These objections are obviated by this invention wherein no electrode movable outside of the tubes is required so that jigs or fixtures required in other machining operations on the tubes may be secured to table 13 wherever desired without interfering with the operation of my welder.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

Having thus described my invention, what I claim as new and useful and desire to secure by Letters Patent is:

1. The method of electrically welding a larger to a smaller tube which comprises the steps of advancing the larger tube into a tube supporting fixture composed of material having large electrical conductance; advancing the smaller tube into the larger tube until a predetermined overlap of the tubes is obtained; advancing an electrically conductive electrode against the smaller tube in the region of the overlap; supplying to the electrode an electrical current ample to fuse a portion of the tube material between the electrode and the supporting fixture and compressing the fused tube material.

2. The method of electrically welding a larger to a smaller tube which comprises the steps of advancing the larger tube into a tube supporting fixture composed of material having large electrical conductance; advancing the smaller tube into the larger tube until a predetermined overlap of the tubes is obtained; advancing an electrically conductive electrode against the smaller tube in the region of the overlap; pressing the electrode firmly against the smaller tube and simultaneously supplying to the electrode an electrical current ample to fuse a portion of the material of both tubes in the path between the electrode and the supporting fixture.

3. The method of electrically welding a larger to a smaller tube which comprises the steps of advancing the larger tube into an electrically conductive tube supporting fixture having a projecting ledge until the tube strikes the ledge; advancing the smaller tube into the larger tube until a predetermined overlap of the tubes is obtained; advancing an electrically conductive electrode against the smaller tube in the region of the overlap; pressing the electrode firmly against the smaller tube; and supplying to the electrode an electrical current ample to fuse a portion of both tubes in the path between the electrode and the supporting fixture.

4. An electric spot welder adapted for welding a first tube having an end portion of given diameter to a second tube of larger diameter than said end portion comprising, in combination: a hollow fixture composed of electrically conductive material and having an interior wall arranged to surround and engage the peripheral surface of the second tube to support the second tube in a predetermined position; supporting means engaging the first tube to support the first tube with the end portion thereof in overlapping engagement with the inner wall of the second tube; a pair of levers having their ends insertable within the fixture and tubes; the first of said levers being provided with a welding electrode and being composed of electrically conductive material; means for forcing said levers apart to press said welding electrode and the end of the second lever against diametrically opposite points on the overlapping portion of the first tube whereby, upon connecting a current source to said fixture and first lever, a welding current passes from said welding electrode through the overlapping portions of said tubes to said fixture and welds the tubes together.

5. An electric welder as claimed in claim 4; in which the means for forcing said levers apart comprises a wedge disposed between said levers; a cylinder; a piston slidable in said cylinder; a rod connecting said wedge to said piston; and a port for admitting fluid under pressure to one end of said cylinder to advance said piston therein.

6. An electric welder as claimed in claim 4; in which spring means is connected to said levers to bias the levers together.

JOSEPH C. WEIDEL.

REFERENCES CITED

The following references are of record in the file of this patent:

UNITED STATES PATENTS

| Number | Name | Date |
| --- | --- | --- |
| 1,070,966 | Kicklighter | Aug. 19, 1913 |
| 1,642,825 | Pearce | Sept. 20, 1927 |
| 2,057,017 | De Ganahl | Oct. 13, 1936 |